United States Patent [19]

Howeth

[11] Patent Number: 4,823,731

[45] Date of Patent: Apr. 25, 1989

[54] MULTIPLE FILTER/CYCLONE AIR FILTRATION APPARATUS WITH SINGLE, MOVABLE FILTER CLEANING SYSTEM

[76] Inventor: D. Franklin Howeth, 233 Chuck Wagon Trail, Forth Worth, Tex. 76108

[21] Appl. No.: 17,814

[22] Filed: Feb. 24, 1987

[51] Int. Cl.⁴ .................................. B05B 15/12
[52] U.S. Cl. .................................. 118/326; 118/634; 118/DIG. 7; 118/308; 98/115.2; 55/302; 55/294; 55/337; 55/284; 55/DIG. 46
[58] Field of Search ................ 118/326, DIG. 7, 634, 118/308; 98/115.2; 55/302, 294, 337, 284, DIG. 46

[56] References Cited

U.S. PATENT DOCUMENTS

| | | | |
|---|---|---|---|
| 2,026,834 | 1/1936 | Holly | 55/294 |
| 2,678,109 | 5/1954 | Yedder | 55/294 |
| 3,280,979 | 10/1966 | King | 55/302 X |
| 3,777,706 | 12/1973 | Kaufman | 118/326 X |
| 3,801,869 | 4/1974 | Masuda | 98/115.2 X |
| 4,277,260 | 7/1981 | Browning | 118/326 X |
| 4,306,890 | 12/1981 | Gustavsson et al. | 55/294 X |
| 4,388,087 | 6/1983 | Tipton | 55/302 X |
| 4,430,956 | 2/1984 | Koch, II | 118/DIG. 7 |
| 4,544,389 | 10/1985 | Howeth | 55/302 |
| 4,545,326 | 10/1985 | Browning | 118/326 |

FOREIGN PATENT DOCUMENTS 2839540 3/1980 Fed. Rep. of Germany ...... 118/634
560558 4/1975 Switzerland ........................ 118/634

Primary Examiner—Shrive Beck
Assistant Examiner—Alain Bashore
Attorney, Agent, or Firm—Hubbard, Thurman, Turner & Tucker

[57] ABSTRACT

An electrostatic dry powder coating spraying system has a multi-color powder coating recovery system comprising a plurality of vertically extending cyclonic filter barrels laterally spaced about a central vertical axis and having vertically aligned upper ends. A single filter cleaning apparatus, including a filter backflushing system, is adapted to rest upon and operatively engage any selected one of such upper barrel ends, and is operative to backflush the filter within the barrel upon which it rests. Oversprayed powder from the spraying system is reclaimed by drawing it through the "active" filter barrel to which the filter cleaning apparatus is connected. To effect a rapid powder color changeover in the recovery system, the filter cleaning apparatus is mounted on a vertically extending support mechanism which is operative to move the filter cleaning apparatus upwardly from its filter barrel, permit the elevated filter cleaning apparatus to be pivoted into alignment with a second filter barrel, and then lower the pivoted filter cleaning apparatus into operative engagement with the second filter barrel.

26 Claims, 4 Drawing Sheets

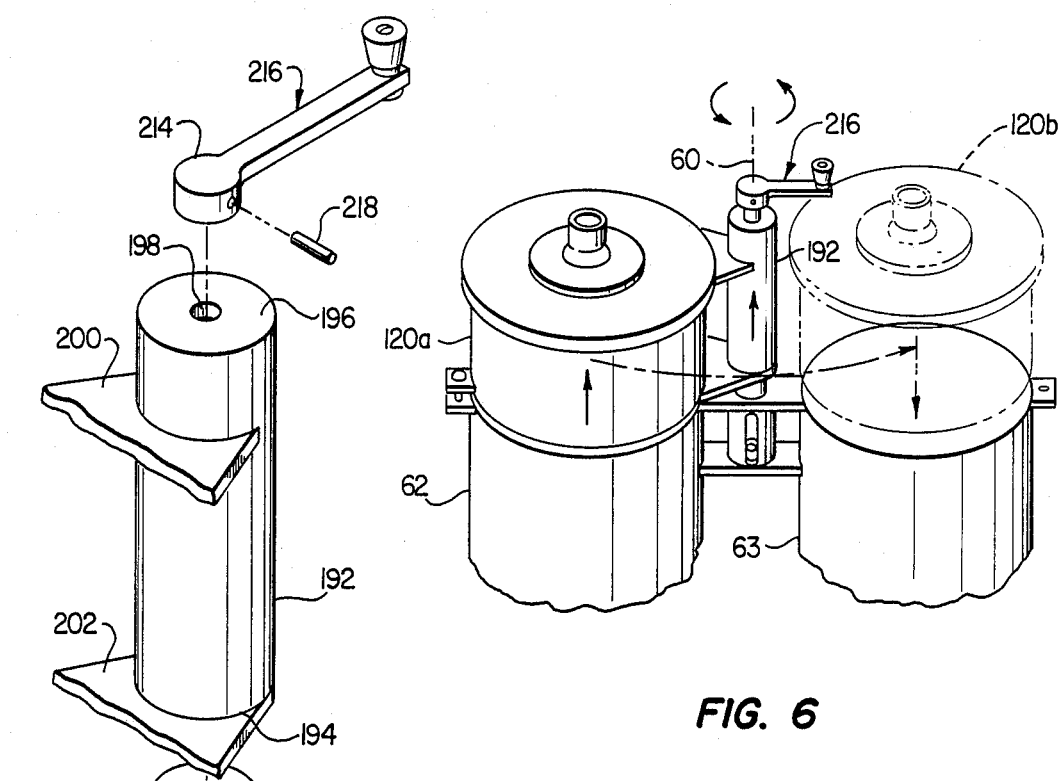
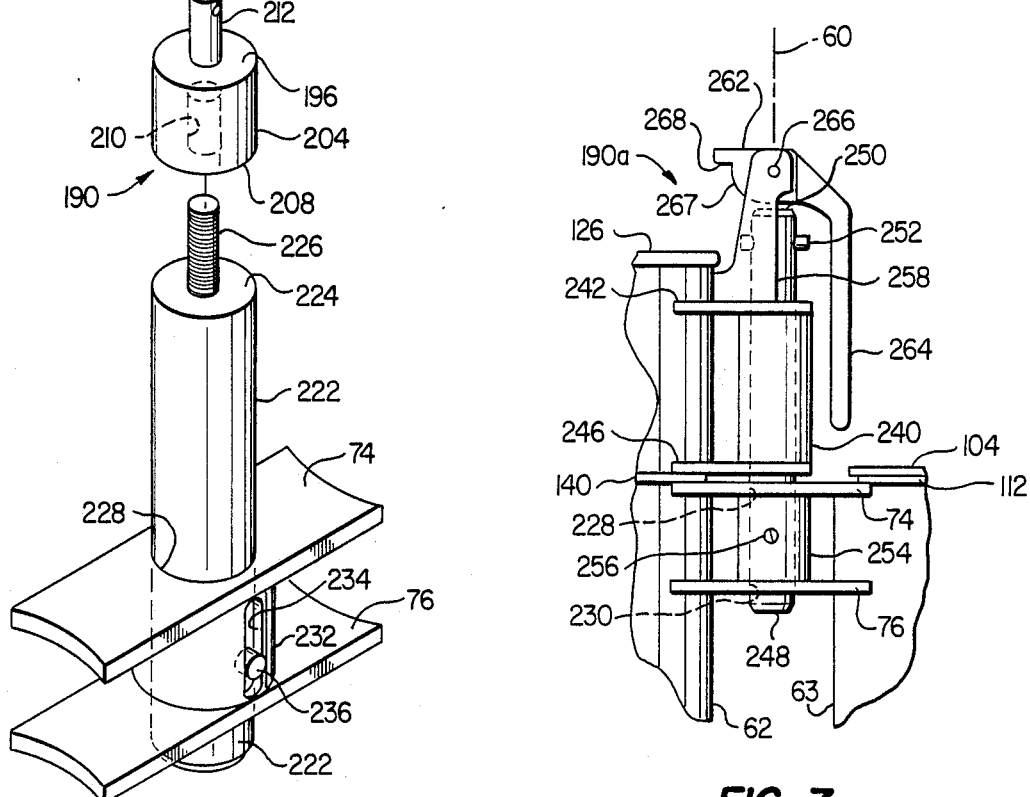
FIG. 5
FIG. 6
FIG. 7

MULTIPLE FILTER/CYCLONE AIR FILTRATION APPARATUS WITH SINGLE, MOVABLE FILTER CLEANING SYSTEM

BACKGROUND OF THE INVENTION

The present invention relates generally to air filtration systems, and more particularly provides a uniquely configured air filtration system which comprises a plurality of cyclonic particulate pre-separators, each having a material collecting chamber and a barrier type filter element housed therein, and a single filter cleaning system which is supported for selective movement into operative engagement with any one of such separators to clean the barrier filter housed therein. As will be seen, the filtration system of the present invention is particularly well suited for use in dry paint or color coating applications to uniquely provide for more rapid changeover to one or more different paint or coating colors.

In the paint or color coating industry, dry powder applications and heat set systems are replacing wet coating application techniques because of, among other reasons, the elimination of the air polluting effluent discharge inherent in wet paint applications. Powder coating methods are especially well suited to high volume production applications where a single color is relegated to the powder application system.

Problems relative to color intermixing occur when it becomes necessary to introduce a different color powder into a given single color system. These color intermix problems are of particular concern in over-sprayed power reclaim systems which typically collect for re-use approximately 60 to 70% of the total dry powder volume discharged from the powder coating guns.

Conventional powder reclaim systems normally comprise an induced draft air flow system which draws the excess powder from the dry powder coating chamber to a single particulate pre-separator and collector housing upon which a self-cleaning barrier filter system is mounted. With each color change in multiple color applications, the powder reclaim system must be disassembled and cleaned of the previous color prior to the introduction into the system of a different color dry powder. Commonly, the single barrier filter is removed and stored for re-use when its color of powder is used again. Entry must be made into the pre-separator and collection chamber to effectively remove the prior color pigments remaining therein before a new color can be utilized in such chambers. Particularly when it is necessary to frequently change powder colors, it can be seen that this conventional system construction necessitates a considerable amount of downtime between each color change.

As a conventional alternative to this single, cleanable filter housing format, particularly where frequent color changes are necessary, systems having multiple particulate pre-separators and collection chambers, each with its own self-cleaning barrier filter system, have been provided for each color powder likely to be used in the dry coating process. As an example, if the overall dry coating process requires the use of six different colored powders, six separate pre-separator housings and associated filters, each "dedicated" to a particular powder color and having its own filter cleaning system, are required. While significantly reducing the color changeover time, the equipment cost of this type of multiple filter and cleaning system apparatus is significantly greater.

It can be seen from the foregoing that, from the standpoint of both labor and equipment cost reduction, improvement over the conventional methods of providing color changes in the dry powder coating industry would be quite desirable. It is accordingly an object of the present invention to provide such improvement.

SUMMARY OF THE INVENTION

In carrying out principles of the present invention, in accordance with a preferred embodiment thereof, a multi-color dry powder coating spraying system is provided which incorporates a unique powder coating recovery system having substantially improved powder color changeover capabilities. The improved recovery system, which is utilized to reclaim undeposited powder generated in the spraying process, comprises a plurality of vertically disposed cyclonic filter barrels arranged in a laterally spaced array about a central vertical axis. The filter barrels have vertically aligned upper ends, depending hopper sections operatively connected to reclaimed powder storage containers, and have mounted therein vertically extending, hollow cylindrical barrier type filter elements.

The plurality of individual filter barrels are provided with a single, movable filter cleaning apparatus which is connectable to any selected one of the barrels and operable to backflush the filter element therein. The single filter cleaning apparatus comprises a cylindrical clean air discharge housing adapted to coaxially rest upon the upper end of any of the filter barrels in gravity-sealed engagement therewith and a filter backflushing system operatively mounted in the discharge housing.

An alignment pin is secured to the discharge housing and is receivable in an opening formed in a cooperating alignment tab carried by each of the filter barrels to thereby properly align the discharge housing with the upper end of the particular filter barrel upon which is rests.

A unique vertical support mechanism is provided which extends along the central vertical axis and mounts the discharge housing, and the filter backflushing system therein, for pivotal movement about the axis from a first position in which the discharge housing is aligned with the upper end of one of the filter barrels, to a second position in which the discharge housing is aligned with the upper end of a selected other one of the filter barrels. The support mechanism is operative to jack the discharge housing upwardly from one filter barrel, permit the elevated discharge housing to be pivoted about the central vertical axis until it is positioned above a second filter barrel, and then lower the pivoted discharge housing onto the second filter barrel.

The discharge housing is carried by the support mechanism in a manner permitting the discharge housing to be pressure-lifted from sealed engagement with the filter barrel upon which is rests to thereby vent the filter barrel in case of an explosion therein. Safety stop means are incorporated into the support mechanism and function to limit the pressure-caused upward venting travel of the discharge housing.

In one embodiment thereof, the jacking support mechanism comprises a vertically extending hollow cylindrical guide sleeve fixedly secured to upper end portions of the filter barrels and having a vertically extending slot formed therethrough. The guide sleeve slidably receives a lower end portion of a vertically extending, elongated cylindrical jacking shaft which extends along the central vertical axis and has a stop pin transversely secured thereto and projecting outwardly through the guide sleeve slot. An upper longitudinal portion of the jacking shaft is slidably received within a lower end portion of a hollow cylindrical support sleeve which is secured to the discharge housing and has an upper endwall which is higher than the upper end of the discharge housing. A reduced diameter upper end portion of the jacking shaft is threaded into a cylindrical adjustment member which is slidably received in the support sleeve above the jacking shaft. A reduced diameter upper end portion of the adjustment member is extended upwardly through an opening in the upper endwall of the support sleeve and is secured to an inner end portion of a crank handle. An annular thrust bearing is interposed between the adjustment member and the upper endwall of the support sleeve within the interior of the support sleeve.

By turning the crank handle in an appropriate direction, the vertical separation between the adjustment member and the jacking shaft is increased to thereby lift the discharge housing upwardly form the filter barrel upon which it rests. The elevated discharge housing may then be pivoted about the jacking shaft and the adjustment member to a position in which the discharge housing is positioned directly above one of the other filter barrels. The crank handle is then rotated in the opposite direction to draw the adjustment member and the jacking shaft closer together, thereby lowering the discharge housing onto the second filter barrel.

The adjustment member and the threaded portion of the jacking shaft are relatively configured and positioned so that at a certain point during the lowering of the discharge housing the jacking mechanism is effectively disengaged from the discharge housing so that no further upward force is being exerted thereon and the entire weight of the discharge housing and its internal backflushing system are borne by the upper end of the filter barrel to which the discharge housing has been moved.

In the event of an explosion within the filter barrel upon which the discharge housing rests, the internal barrel pressure lifts the discharge housing to vent the filter barrel, the upward venting travel of the discharge housing causing upward movement of the jacking shaft relative to the cylindrical guide sleeve. In this embodiment of the support mechanism, the safety stop means are defined by the radially projecting shaft pin which, when it engages the upper end of the guide sleeve slot, functions to prevent further upward movement of the support housing. The side edge portions of the guide sleeve slot act as stop surfaces to prevent appreciable side-to-side movement of the pin to thereby prevent rotation of the jacking shaft.

In an alternate embodiment thereof, the jacking support mechanism comprises a vertically extending hollow cylindrical guide sleeve which extends along the central vertical axis and is fixedly secured to the filter barrels. The sleeve axially receives a lower end portion of a jacking shaft which is fixedly secured to the sleeve by means of a retaining pin extending transversely through the sleeve into the lower end portion of the jacking shaft. A central longitudinal portion of the jacking shaft is slidably received in a hollow cylindrical support sleeve which is in turn secured to the clean air discharge housing by a pair of upper and lower support plates connected at their outer ends to the upper and lower ends of the support sleeve. A safety stop pin is extended transversely through an upper end portion of the jacking shaft and projects radially outwardly from diametrically opposite side surface portions thereof.

The lower ends of a pair of mutually spaced, vertically extending support arms are secured to the upper support plate and have upper end portions which are positioned above the upper end of the jacking shaft. The inner end portion of a jack handle is positioned between the upper ends of the support arms and is secured thereto by a retaining pin member. The underside of this inner end portion of the jack handle has a cammed surface which, with the discharge housing resting upon one of the filter barrels, is vertically spaced apart from the upper end of the jacking shaft. By pivoting the jack handle, the cammed surface thereof is brought into engagement with the upper end of the jacking shaft to thereby lift the discharge housing and permit it to be pivoted to above another filter barrel. The jack handle is then pivoted in the opposite direction to lower the discharge housing onto the filter barrel to which it is to be reconnected.

During the lowering of the discharge housing the cammed jack handle surface is taken out of engagement with the upper end of the jacking shaft so that the full weight of the discharge housing and its internal filter backflushing system is transferred to the new filter barrel. In the event of an explosion within the filter barrel upon which the discharge housing sealingly rests, the discharge housing is raised to vent the filter barrel, causing the support sleeve to slide upwardly along the jacking shaft. Upward travel of the support sleeve, and thus the discharge housing, is terminated when the upper end of the support sleeve engages the safety stop pin extending through an upper end portion of the jacking shaft.

During operation of the powder recovery system, powder-laden air from an oversprayed powder-collecting hopper portion of the spraying system is drawn through the filter barrel to which the filter cleaning apparatus is connected by means of a scavenge fan operatively connected to an inlet pipe on the filter barrel and a discharge pipe on the clean air discharge housing. The filter element within the filter barrel upon which the discharge housing rests (i.e., "active" filter housing) is secured to the discharge housing by means of a draw bar and draw bolt connecting assembly which operates to suspend the filter from the discharge housing in a vertical orientation. Coupled with the weight of the discharge housing and its internal filter backflushing system, the weight of the suspended filter causes the discharge housing to compress a housing end seal element interposed between the discharge housing and the filter barrel below it. The discharge pipe on the discharge housing is secured to a cover plate thereon above an access opening formed in the cover plate. Removing the discharge pipe provides access to the draw bolt which can be disconnected from the draw bar to permit the discharge housing to be lifted and pivoted as previously described.

The filter elements in each of the "inactive" filter barrels are suspended, by means of a draw bolt and draw bar assembly, from a cover plate which rests upon the upper end of each inactive filter barrel. The weight of such cover plates, and the filters which are suspended therefrom, rests upon and compresses an annular end seal interposed between the upper end of the filter barrel and its cover plate. Such filters are easily removed by simply lifting the cover plates from the inactive filter barrels. In a similar manner, the filter element in the active filter barrel may be simply lifted upwardly therefrom when the discharge housing is moved away from such filter barrel after disconnection from the filter element.

Circumscribing an upper longitudinal portion of each of the filters in the recovery system is a hollow cylindrical filter shroud having an annular support flange at its upper end. The support flanges rest upon annular ledges formed in the upper endwalls of the filter barrels. Accordingly, all of the filter shrouds may be quickly and easily removed from their associated filter barrels by simply lifting then outwardly therefrom. This provides easy access to the entire interior surfaces of the filter barrels for cleaning purposes.

When the draw bolt in the discharge housing is disconnected from the filter draw bar of a first filter barrel and the discharge housing is pivoted to a second filter barrel, the draw bolt in the discharge housing is simply threaded into the draw bar of the filter within the second housing. The previously removed cover plate of the second housing can then be rested upon the first filter barrel and the cover plate's draw bolt connected to the filter draw bar in the first housing. The scavenge pump may be then reconnected to the inlet of the second filter barrel so that the recovery system can be restarted to reclaim a second color of powder from the spraying system.

The improved powder recovery system of the present invention provides a variety of advantages over conventional single and multi-filter recovery systems. Compared to single filter systems, the multi-filter system of this invention provides a significant reduction in operational downtime and labor costs since it is not necessary to clean a given filter barrel, and replace its associated filter, each time a powder color changeover is required. Each filter may be left in place and, together with its filter barrel, be "dedicated" to one of several powder colors used in the spraying process.

Compared to conventional recovery systems utilizing a series of filter barrels each having its own separate cleaning system, the present recovery system represents a significant equipment cost reduction since a single, movable filter cleaning system is uniquely provided to service any of a series of filter barrels. The support mechanism which provides this desirable characteristic also permits the use of a simple, yet effective gravity-sealed interengagement between the single cleaning system and the filter barrel upon which it rests, and a stop-limited barrel venting system which advantageously utilizes this interengagement technique.

The cleaning access to the interiors of the filter barrels is also substantially improved by the use of the quickly removable drop-in filter shrouds and the suspended, lift-out filter mounting apparatus.

BRIEF DESCRIPTION OF THE DRAWINGS

FIG. 5 is an exploded perspective view of the support mechanism cross-sectionally depicted in FIG. 4;

FIG. 6 is a greatly simplified fragmentary perspective view of an upper end portion of the coating recovery system, and schematically illustrates the manner in which the filter cleaning apparatus may be jacked upwardly from one filter housing, pivoted about a vertical axis of the support mechanism, and then lowered into operative engagement with another of the recovery systems's filter housings;

FIG. 7 is a fragmentary elevational view of the coating recovery system illustrating an alternate embodiment of the support mechanism in its lowered position;

DETAILED DESCRIPTION

Figure 1:
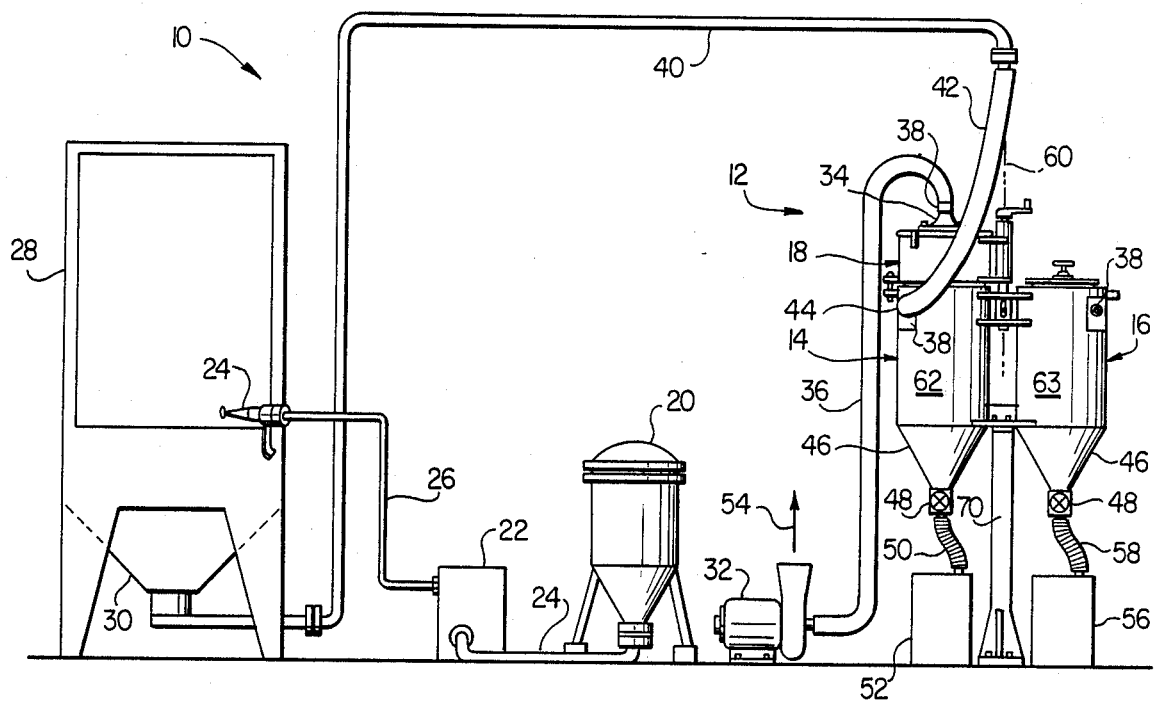
FIG. 1 is an elevational view of an electrostatic powder coating system having incorporated therein a unique multi-color powder coating recovery system that embodies principles of the present invention.

Illustrated in FIG. 1 is a representative electrostatic dry powder coating spraying system 10 which incorporates a unique multi-color powder coating recovery system 12 that embodies principles of the present invention and significantly improves and shortens the powder color changeover process. As will be described subsequently in greater detail, the recovery system 12 comprises a pair of cyclonic air filtration barrels 14 and 16, each of which is "dedicated" to a particular powder color and has operatively disposed therein a barrier type filter element (not illustrated in FIG. 1). The two cyclonic barrels 14, 16 are utilized one at a time and are uniquely provided with a single filter cleaning apparatus 18 which, in a manner subsequently described, is supported for movement into operative engagement with either of the barrels 14, 16 to clean the filter element disposed therein. In FIG. 1 the filter cleaning apparatus 18 is shown operatively connected to the cyclonic barrel 14.

During operation of the coating system 10, dry powder coating of a selected color is disposed within a powder supply cannister 20 and is drawn into a conventional powder and gun control cabinet 22 through a transfer pipe 24 interconnected between the cannister 20 and the cabinet 22. Powder entering the cabinet 22 may be selectively discharged through a dry powder coating spray gun 24 connected to the cabinet 22 by a flexible powder supply conduit 26. Powder discharged from the gun 24 is sprayed onto an object to be coated (not shown) disposed in a conventional enclosed electrostatic powder application booth 28 having an oversprayed powder collection hopper 30 depending therefrom.

A substantial portion of the sprayed powder does not normally adhere to the object, but falls instead into the collection hopper 30. The powder falling into hopper 30 is scavenged therefrom, and drawn through the cyclonic barrel 14, by means of a scavenging air vacuum pump 32. The inlet of pump 32 is connected to a clean air discharge pipe 34 on the filter cleaning apparatus 18 by means of a flexible hose 36 having a quick disconnect fitting 38 removably connected to the discharge pipe 34. The cyclonic barrel 14, like the cyclonic barrel 16, is provided with an inlet pipe 38. An overspray powder recovery scavenge transfer line 40 is connected at one end thereof to the hopper 30 and at the other end thereof to the inlet pipe 38 of barrel 14 by means of a flexible hose 42 having a quick disconnect fitting 44 removably secured to the inlet pipe 38 of barrel 14.

Operation of the pump 32 draws a mixture of air and collected dry powder in hopper 30 into and through the cyclonic barrel 14 via the line 40 and the flexible hose 42. Traversal of the cyclonic barrel 14 by this powder-laden air stream filters the powder from the air and retains the separated powder within the barrel 14. By virtue of an initial cyclonic separation action, and the operation of the filter cleaning apparatus 18 as subsequently described, the separated powder is caused to drop into a hopper section 46 of the barrel 14 which is provided at its lower end with an outlet valve device 48. By periodically opening the valve 48 the reclaimed powder within the cyclonic barrel 14 may be dumped through a flexible conduit 50 into a suitable reclaimed powder storage container 52.

The cleansed air stream exiting the filter element within the barrel 14 is drawn into the pump 32 via the discharge pipe 34 and the hose 36 into the inlet of the pump 32 and discharged from the pump in the form of a clean air stream 54. The reclaimed powder in the storage container 52 of barrel 14 may be subsequently re-used in the powder coating process.

When it becomes necessary to utilize a powder of a different color, the powder supply cannister 20 is appropriately loaded with the different color powder and the quick disconnect fitting 44 of the flexible hose 42 is removed from the inlet pipe 38 of cyclonic barrel 14 and reconnected to the inlet pipe 38 of barrel 16. Then, in a manner subsequently described, the filter cleaning apparatus 18 is disconnected from the barrel 14, rotated about a unique supporting mechanism, and quickly reconnected to the cyclonic barrel 16.

The system 10 may then be operated as previously described to spray the different colored powder onto an object within the powder application booth 28. The overspray portion of this different colored powder is then reclaimed from the booth hopper 30 by operation of the pump 32 which draws the powder through the barrel 16 in which the reclaimed powder is retained in its hopper 46 for dumping through the valve 48 of barrel 16 into a second reclaimed powder storage container 56 through a flexible conduit 58.

It can be readily seen that the use of the single, movable filter cleaning apparatus 18, which is connectable to either of the cyclonic barrels 14 and 16, substantially reduces the powder color changeover time compared to powder coating recovery systems utilizing a single cyclonic barrel which must be cleaned thoroughly before a different colored powder can be used in conjunction therewith. Compared to conventional single filter barrel recovery systems, the improved multi-barrel recovery system 12 provides significant labor cost savings. Moreover, since a single filter cleaning apparatus is used to service each of the barrels 14, 16 the system 12 also provides a significant apparatus cost savings over conventional systems in which each of a series of cyclonic barrels is provided with a separate filter cleaning system.

The structure of the recovery system 12 which provides these unique advantages will now be described in detail with reference to FIGS. 1–3. The barrels 14, 16 are vertically oriented and extend parallel to a central vertical axis 60 about which they are spaced. The vertically extending barrels 14, 16 respectively comprise hollow cylindrical filter housings 62 and 63, each of which defines therein a contaminant chamber 64 (FIG. 2) and has an upper end wall 66. End walls 66 are vertically aligned and have formed therethrough central circular openings 68. As can best be seen in FIGS. 2 and 3, the inlet pipes 38 are connected to sidewall portions of the housings 62 and 63 in a generally tangential orientation, and are positioned slightly below the upper end walls 66.

Filter housings 62 and 63 are supported in an elevated position by a pair of support legs 70 which are bolted at their upper ends to a flanged support plate 72 welded at opposite end portions thereof to the laterally spaced housings 62 and 63 adjacent their junctures with their hopper sections 46. The filter housings 62 and 63 are also intersecured adjacent their upper ends by a pair of vertically spaced upper and lower support plates 74 and 76 which are welded at their opposite ends to facing peripheral portions of the housings 62 and 63. Respectively disposed within the filter housings 62, 63 are vertically oriented, hollow cylindrical barrier type filter elements 78 and 80, each of such filter elements having an interior clean air flow passage 82 which opens outwardly through its upper and lower ends 84 and 86.

The filter 80 (FIG. 2) is mounted within the housing 63 by means of an elongated filter draw bar 88 which extends vertically through the flow passage 82 of filter 80 and has at its lower end an alignment probe portion 90 which is slidably received in a central opening formed in a filter guide and support bar 92. Support bar 92 extends transversely across the interior of the housing 63 and is secured at its opposite ends to the housing slightly above the support plate 72.

Secured to the draw bar 88 above the support bar 92 is a disc-shaped filter cap 94 which supports the lower end 86 of the filter 80. Interposed between the end cap 94 and the lower end 86 of filter 80 is an annular filter seal 96 which circumscribes the draw bar 88. Draw bar 88 has an internally threaded, enlarged upper end portion 98 which receives the threaded lower end portion 100 of a relatively short draw bolt 102. Draw bolt 102 is extended vertically through a central opening formed in a disc-shaped barrel cover plate 104 and is provided at its upper end with a suitable handwheel portion 106 which is sealed to the upper surface of the cover plate 104 by an annular seal element 108 interposed between the handwheel 106 and the coverplate 104.

The upper end 84 of the filter element 80 is sealed to the lower side surface of the cover plate 104 by an annular seal element 110 interposed between the filter end 84 and the coverplate 104. Cover plate 104 rests upon the upper endwall 66 of housing 63 and is sealed thereto by an annular cover seal element 112 interposed between the cover plate and the upper housing endwall.

It can be seen that by tightening the draw bolt 102 into the draw bar end portion 98, the filter end cap 94 is drawn upwardly to thereby compress the lower filter seal 96 between the end cap 94 and the lower filter end 86, and to compress the upper filter seal 110 between the upper filter end 84 and the coverplate 104, to thereby seal the upper and lower ends of the filter element 80. Secured in this manner to the coverplate 104, the filter element 80 is suspended from the coverplate which rests upon the upper endwall 66 of the housing 63, the weight of the suspended filter element 80 combining with the weight of the cover plate 104 to compress the cover plate seal element 112 to thereby seal the open upper end of the housing 63. The filter element 80 can accordingly be rapidly removed from the within the interior of the filter housing 63 simply by lifting the cover plate 104 from the housing.

Figure 10:
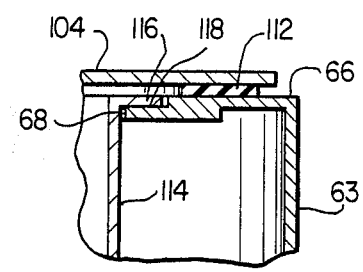
FIG. 10 is an enlargement of the circled area "10" in FIG. 9

An upper longitudinal portion of the filter element 80 is outwardly circumscribed by a hollow cylindrical filter shroud 114 which is supported by the upper housing endwall 66 of housing 63 in a unique manner which permits the rapid removal of the shroud 114 when it becomes necessary to clean the interior of housing 63. As may best be seen in FIG. 10, the shroud 114 is provided at its upper end with an annular exterior support flange 116 which rests upon an annular ledge 118 formed in the upper endwall 66 around the periphery of the endwall opening 68 of the housing 63. Upon removal of the coverplate 104 and the filter element 80 suspended therefrom, the filter shroud 114 can simply be lifted outwardly through the endwall opening 68 to thereby provide ready access to the interior surface of the housing 63 for cleaning thereof. When such cleaning process is complete, the filter shroud may be simply dropped back into the housing 63 through its endwall opening 68 so that the flange 116 reengages the ledge 118. The coverplate 104 with the filter 80 (or a new filter element) may then be rested again on the cover seal 112 of housing 63 with the alignment probe 90 being received in the opening formed through the support bar 92.

Figure 2:
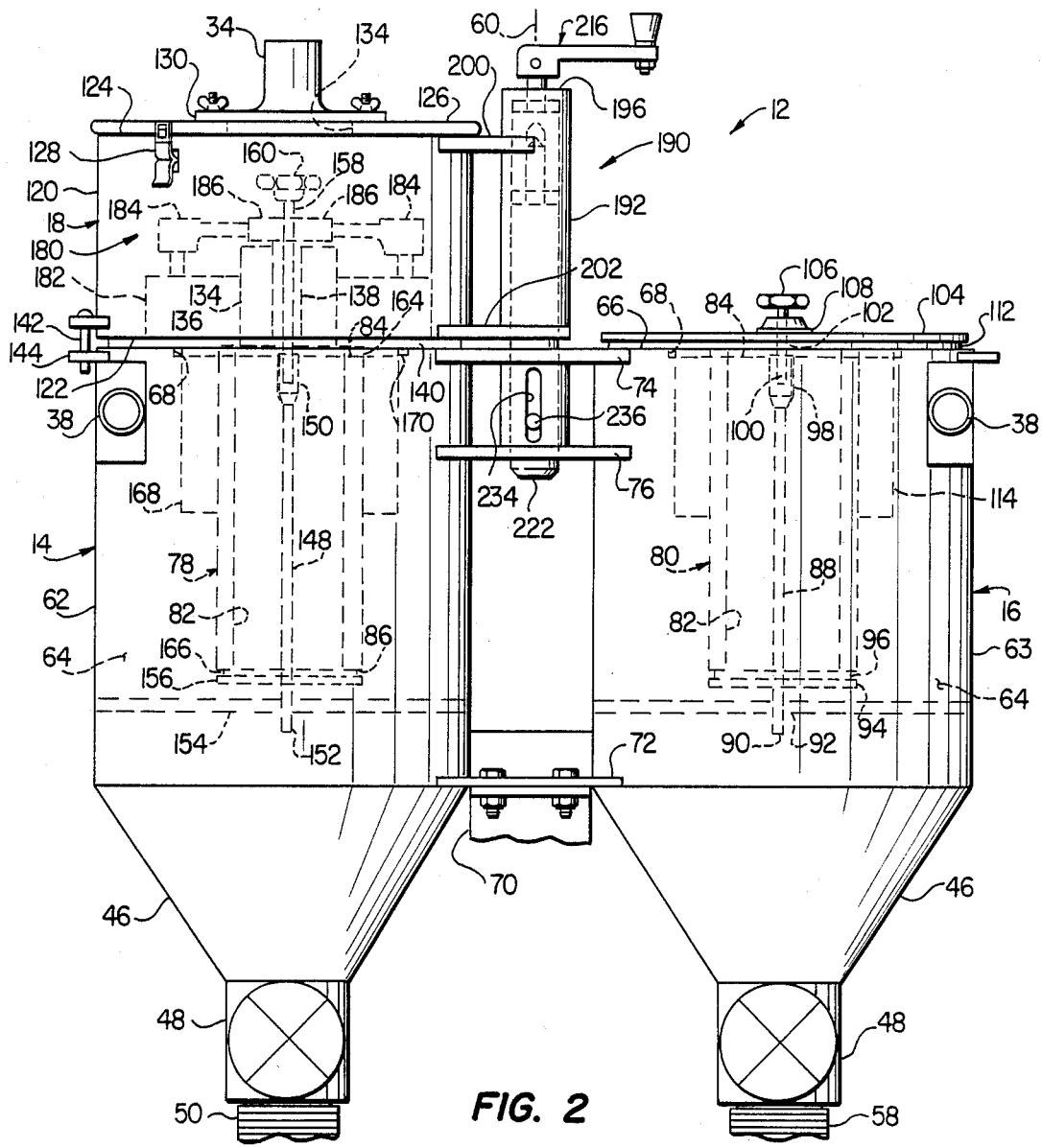
FIG. 2 is an enlarged scale fragmentary elevational view of the filter housing and filter cleaning apparatus portion of the coating recovery system, with certain internal components thereof being illustrated in phantom.
Figure 3:
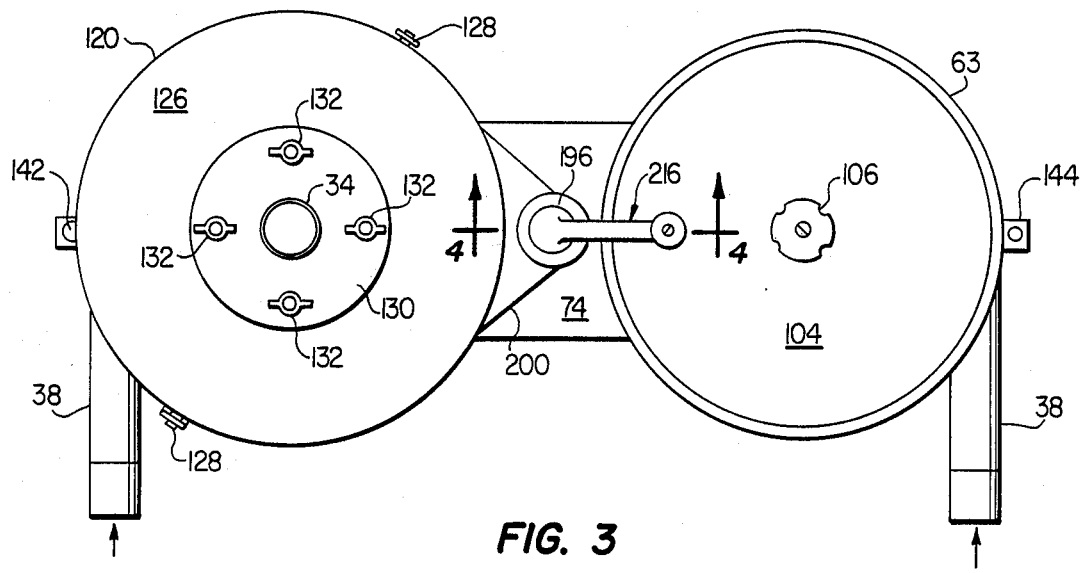
FIG. 3 is a top plan view of the coating recovery system portion depicted in FIG. 2.

Referring now to FIGS. 2 and 3, the single filter cleaning apparatus 18 comprises a hollow cylindrical clean air discharge housing 120 which has a lower end wall 122 and an open upper end 124. Housing 120 has an external diameter identical to that of housing 62 and is coaxially disposed upon the upper end thereof. The open upper end 124 of housing 120 is closed by a disc-shaped cover plate 126 that is removably secured to the housing 120 by a pair of cover latch members 128. The clean air discharge pipe 34 is provided at its lower end with a mounting flange 130 which is secured to the coverplate 126 by a series of attachments bolts and wing nuts 132 so that the discharge 34 is positioned over and communicates with a central access opening 134 formed through the cover plate 126.

Coaxially secured to the lower end wall 122 of the housing 120, and projecting upwardly into housing 120, is a hollow cylindrical clean air flow tube 134 which circumscribes a central circular opening 136 formed through the end wall 122. A hollow cylindrical guide member 138 is coaxially supported within the flow tube 134. The housing 120 rests upon and compresses an annular seal element 140 interposed between the upper endwall 66 of the housing 62 and the lower end wall 122 of housing 120. Proper rotational alignment between the housings 62, 120 is maintained by an alignment pin 142 secured to the housing 120 and received in an opening formed through an alignment tab 144 secured to the housing 62. The filter housing 63 also has secured thereto an alignment tab 146 which is identical to the tab 144.

The filter element 78 is vertically mounted within the housing 62 by means of a filter draw bar 148 which extends vertically through the clean air flow passage 82 of filter 78 and has an internally threaded, enlarged upper end portion 150. Formed on the lower end of the draw bar 148 is an alignment probe portion 152 which extends through a central opening formed in a support bar 154 which is similar to the previously described support bar 92 and is interconnected at its opposite ends to interior surface portions of the housing 62. As in the case of the draw bar 88 in the housing 63, the draw bar 148 has an end cap portion 156 positioned between the support bar 154 and the lower end 86 of its associated filter element 78.

Filter 78 is secured to the lower end wall 122 of housing 120, and suspended therefrom, by means of an elongated draw bolt 158 which is provided at its upper end with a small hand wheel portion 160 and is extended downwardly through the interior of the hollow cylindrical guide member 138 and threaded into the upper end portion 150 of the filter draw bar 148. Draw bolt 158 is provided with a radially enlarged portion 162 which bears against the upper end of the guide member 138. By tightening the draw bolt 158 into the draw bar upper end portion 150, the end cap 156 is drawn upwardly to compress annular filter end seals 164, 166 respectively interposed between the upper end of filter 78 and the lower end wall 122 of housing 120, and the end cap 156 and the lower end of filter 78.

The filter housing 62 is provided with a hollow cylindrical filter shroud 168 which is identical to the previously described filter shroud 114 and outwardly circumscribes an upper longitudinal portion of the suspended filter element 78. Like the shroud 114, the filter shroud 168 is provided at its upper end with a support flange 170 which rests upon an annular ledge 172 formed in the upper endwall 66 of the housing 62 around its central opening 68. Accordingly, when the clean air discharge housing 120 is moved out of operative engagement with the filter housing 62 in a manner subsequently described, the filter 78 and its shroud 168 may be simply lifted upwardly from the housing 62 to provide ready cleaning access to its interior surface.

The single filter cleaning apparatus 18 also comprises a generally conventional filter backflushing system 180 operatively mounted within the interior of the clean air discharge housing 120. Backflushing system 180 comprises a hollow annular air intake plenum 182 which circumscribes flow tube 134 and receives and stores a supply of pressurized air from a source thereof (not illustrated). Operatively connected to the plenum 182, and spaced around its upper end, are a series of backflushing valves 184 which are in turn connected to a series of backflushing outlet heads 186 positioned over the upper end of the clean air flow tube 134. In a conventional manner, when it is desired to backflush the filter element 78, the valves 184 are opened (either simultaneously or sequentially) to force jets of high pressure air downwardly through the heads 186 into the interior of filter 78 via the clean air flow tube 134. The high pressure air flowed into the filter interior is forced laterally outwardly through the filter to dislodge therefrom coating powder which has adhered thereto during operation of the powder recovery system. The dislodged powder falls downwardly into the hopper section 46 of housing 62 where it may be removed for re-use as previously described by opening the valve element 48 of housing 62. As will be seen, the backflushing system 180 is movable with the clean air discharge housing 120 into operative alignment with the other filter housing 63 for use in cleaning its filter element 80.

During operation of the powder coating recovery system 12, powder-laden air is drawn tangentially into the housing 62 via its inlet pipe 38 and flows around the exterior of the removable filter shroud 168 in a generally cyclonic pattern. This cyclonic flow pattern centrifugally causes an initial extraction of a portion of the powder from the air and causes the removed particulate matter to drop into the hopper section 46 of housing 62. The still powder-laden air is then drawn laterally inwardly through the filter 78 into its clean air flow passage 82 to thereby remove substantially all of the remaining powder entrained in the air stream. The substantially clean air entering the interior of filter 78 is then drawn upwardly through the clean air flow tube into the interior of housing 120 and is finally drawn into and discharged from the scavenge pump 32 (FIG. 1) via the clean air discharge pipe 34 and the hose 36.

The single filter cleaning apparatus 18 is mounted on the interconnected filter housings 62, 63 for selective movement into operative engagement with either of such housings by a unique support mechanism 190 which will now be described in detail with reference to FIGS. 2-5. Support mechanism 190 includes a vertically extending, elongated hollow cylindrical upper support sleeve 192 having an open lower end 194 and an upper endwall 196 having a central opening 198 formed therethrough. Sleeve 192 extends coaxially along the central vertical axis 60 and is secured to the clean air discharge housing 120, in a laterally spaced relationship therewith, by a pair of vertically spaced, generally triangularly shaped upper and lower support plates 200 and 202, with the upper sleeve end 196 being somewhat higher than the coverplate 126 of housing 120. The apex portion of the upper support plate 200 is welded to the sleeve 192, while its base portion is welded to a circumferential portion of the housing 120 adjacent the upper end thereof. Similarly, the apex portion of the lower support plate 202 is welded to the sleeve 192 adjacent its lower end 194, and the base portion of the plate 202 is welded to a circumferential portion of the housing 120 adjacent its lower end.

Slidably disposed within an upper end portion of the interior of sleeve 196 is a cylindrical adjustment member 204 having an upper end surface 206, a lower end surface 208, and an internally threaded bore 210 extending axially inwardly through a central portion of the lower end surface 208. Adjustment member 204 has formed integrally therewith a reduced diameter cylindrical connecting post portion 212 which projects upwardly from the upper end surface 206 and is slidably extended outwardly through the sleeve end opening 198. The outer end of the connecting post 212 is received in an inner end portion 214 of a crank handle 216 and is secured thereto by a retaining pin 218. Circumscribing the connecting post 212, and interposed between the upper endwall 196 and the upper adjustment member end 206, is an annular thrust bearing 220.

An upper end portion of an elongated cylindrical jacking shaft 222 is slidably received within the support sleeve 192 beneath the adjustment member 204. The shaft 222 has formed on its upper end 224 an axially projecting, reduced diameter cylindrical connecting stud 226 which is externally threaded and is screwed into the internally threaded bore 210.

The vertically spaced support plates 74 and 76, which intersecure the filter housings 62 and 63, have respectively formed therethrough aligned circular openings 228 and 230. Vertically intersecured between the support plates 74, 76 is a hollow cylindrical guide sleeve 232 which is in registry at its opposite ends with the openings 228, 230 and has a vertically extending slot 234 formed through a sidewall portion thereof. A lower end portion of the jacking shaft 222 is slidably received in the openings 228, 230 and the guide sleeve 232 for vertical movement relative thereto. A stop pin 236 is secured to the lower end portion of the shaft 222 and projects radially outwardly therefrom through the slot 234.

The side surfaces of the slot 234 prevent appreciable side-to-side movement of the pin 236 and thereby prevent appreciable rotation of the jacking shaft 222. Shaft 222 is vertically movable relative to the support plate 74, 76 and the guide sleeve 232. However, such vertical movement of the shaft 222 is limited by the upper and lower ends of the slot 234 which function as vertical stop surfaces for the pin 236.

Before describing the unique manner in which the clean air discharge housing 120 is moved from the filter housing 62 and operatively reconnected to the filter housing 63, it should be noted that the support mechanism 190 uniquely provides the powder coating recovery system 12 with an important safety feature—namely, the automatic safety venting of the filter housing to which the filter cleaning apparatus 18 is operatively connected. As previously mentioned, the clean air discharge housing 120 rests upon the annular filter element 140 on the housing 62 and sealingly compresses the element 140 by virtue of the combined weight of the housing 120, the filter element 78 suspended therefrom, and the backflushing system 180 operatively disposed therein. In the event of an explosion within the housing 62, or other large pressure rise therein, the support mechanism 190 uniquely permits the housing 120 (together with its suspended filter element 78) to be pressure-lifted from engagement with housing 62 to vent the interior thereof.

Figure 4:
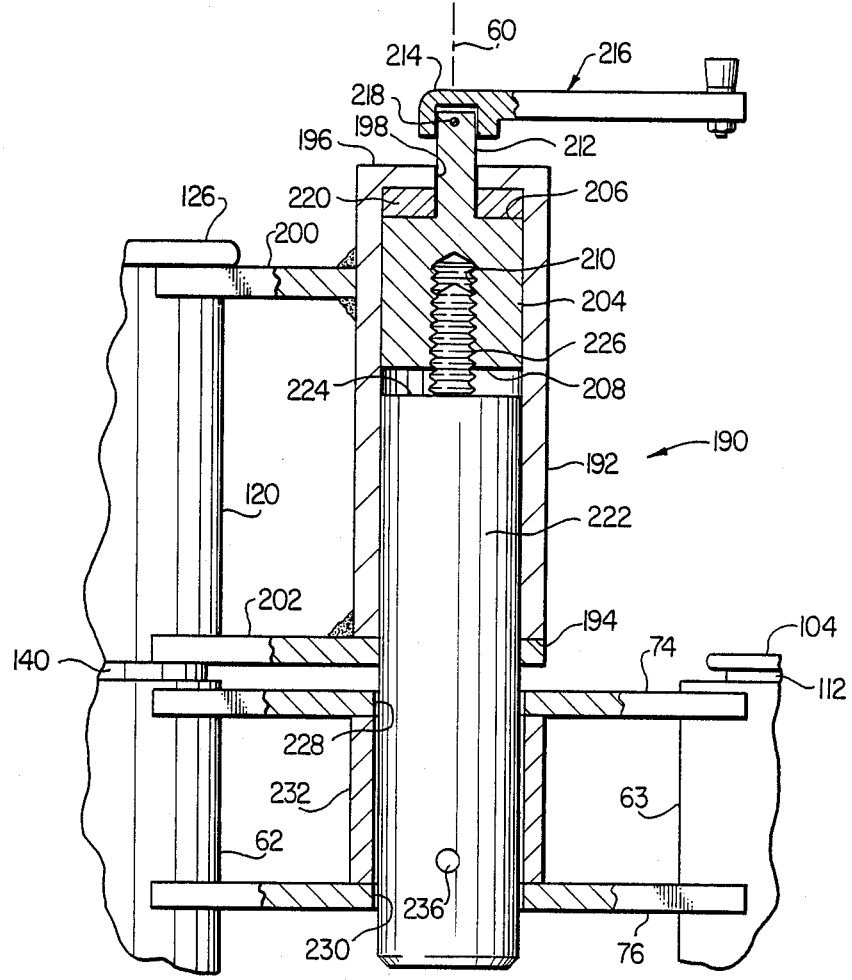
FIG. 4 is an enlarged scale fragmentary cross-sectional view through the coating recovery system, taken along line 4—4 of FIG. 3, illustrating a unique support mechanism used to pivotally mount a single filter cleaning apparatus for selective connection to either of two representative filter housings.

With particular reference to FIG. 4, it can be seen that such lifting of the housing 20 will lift the support sleeve 192 until its upper end 192 engages the inner end portion 214 of the crank handle 216. Further pressure-lifting of the housing 120 will cause the interconnected adjustment member 204 and jacking shaft 222 to be moved upwardly relative to the support plate 74, 76. However, further upward movement of the jacking shaft 222 is terminated when the pin 236 is engaged by the upper end of the slot 234. Accordingly, the pin 236 acts as a safety mechanism to limit the upward venting travel of the housing 120 while at the same time maintaining a mechanical interconnection between the housing 120 and the support plates 74, 76 in the event of an explosion within the housing 62.

To effect a rapid powder color changeover in the coating system 10 the cannister 20 (FIG. 1) is appropriately reloaded with the different color powder and the hose 42 is disconnected from the inlet pipe 38 of housing 62 and reconnected to the inlet pipe 38 of the housing 63. The clean air discharge pipe 34 (FIG. 2) is removed from the cover plate 126 and, through the access opening 134, the drawbolt 158 is unscrewed from the filter draw bar 148. Similarly, the shorter drawbolt 102 in housing 63 is unscrewed from the filter draw bar 88 and the coverplate 104 is removed from the filter housing 63.

Referring now to FIGS. 4–6, the crank handle 216 is then rotated in a counterclockwise direction (as viewed from above in FIGS. 4–6) to lift the clean air discharge housing 120 from the filter housing 62 to the solid line elevated position $120_a$ depicted in FIG. 6. Such counterclockwise rotation of the crank handle 216 causes a corresponding counterclockwise rotation of the adjustment member 204 relative to the rotationally restrained jacking shaft 222. In turn, by virtue of the threaded interconnection between the connecting stud 226 and the bore 210, such relative rotation causes the adjustment member 204 to move upwardly relative to the jacking shaft 222 to thereby lift the support sleeve 192, the support plates 200, 202 and the housing 120.

Figure 9:
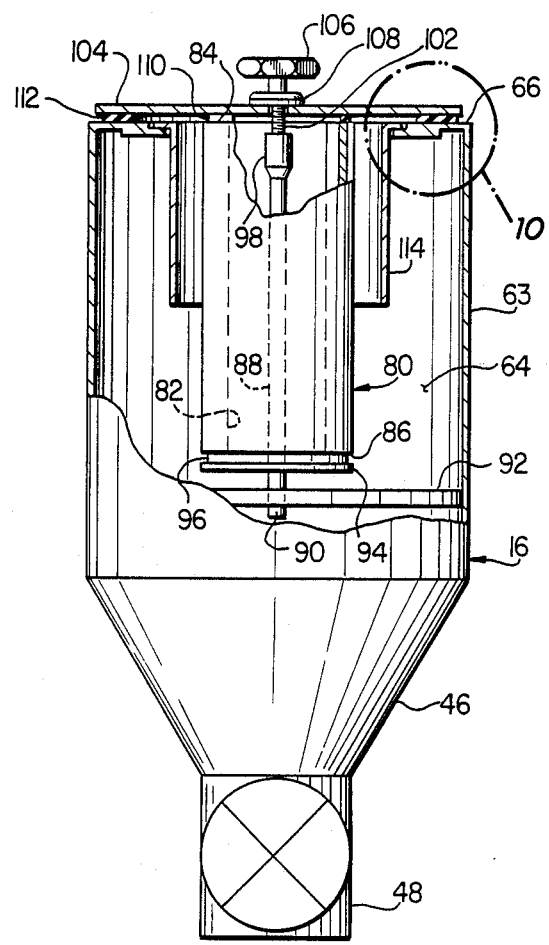
FIG. 9 is a partially sectioned elevational view of one of the filter housings of the coating recovery system and illustrates a removable filter shroud mounted therein.

When the housing 120 has been lifted in this manner to its elevated position $120_a$ (FIG. 6) the housing 120, the support plates 200 and 202, and the support sleeve 192 are then pivoted about the jacking shaft 222 and adjustment member 204 (around the vertical support mechanism axis 60) until the housing 120 is moved to the dotted line elevated position $120_b$ (FIG. 6) in which the housing 120 is aligned with the upper end of the filter housing 63. The crank handle 216 is then rotated in a clockwise direction to lower the housing 120 onto the housing 63 so that the alignment pin 142 is received within the alignment tab 146 of housing 63, and the weight of the housing 120 and its internal backflushing system 180 rests upon and compresses the annular upper end seal 112 (FIGS. 2 and 9) of the housing 63.

To complete the rapid color changeover process, the drawbolt 158 is tightened into the draw bar 88 of filter element 80, the clean air discharge pipe 34 is reconnected to the coverplate 126 of housing 120, and the removed coverplate 104 is connected to the upper end of housing 62 by tightening the drawbolt 102 into the draw bar 148 within housing 62. The spraying system 10, with a now-different colored powder therein, may be re-started. The different colored powder may now be filtered and cleaned within the housing 63 and the filter element 80 may be periodically backflushed using the repositioned single filter cleaning apparatus 18. Importantly, there is no need to clean a filter element or the interior of a filter housing prior to running the different colored powder through the coating system 10. Each of the filter housings 62, 63 may be "dedicated" to one of two powder colors.

It is important to note that the jacking support mechanism 190 is operative during the lowering of housing 120 to effectively disengage itself from the housing 120 (in the sense that the mechanism 190 ceases to impose a lifting force on the housing 120) so that when the lowering is complete the full weight of the housing 120, its internal filter backflushing system 180, and the weight of the filter subsequently suspended from the housing, is imposed on the upper end of one of the filter housings to thereby efficiently compress the annular housing seal element 140.

To illustrate this feature, let it be assumed that, instead of being raised from housing 62, the housing 120 depicted in FIG. 4 is being lowered onto housing 62 and has just engaged the annular end seal 140. At this position of housing 120 the support mechanism 190 is still, for the most part, supporting the weight of housing 120 and its contents and there is a gap between the facing end surfaces 208, 224 of the adjustment member 204 and the shaft 222. Further, there is an upward force still being exerted on the sleeve end wall 196 by the adjustment member 204 via the thrust bearing 220.

Further advancement of the adjustment member 204 toward the end surface 224 of shaft 222, however, narrows the gap between shaft 222 and member 204 and progressively transfers the weight of housing 120 and its contents from the support mechanism 190 to the housing 62. The threaded connecting post 226 and bore 210 are relatively positioned and configured so that prior to the complete closing of the gap between shaft 222 and member 204 this weight transfer is completed.

The illustrated powder coating recovery system 12, with its two filter housings 62 and 63 and its single movable filter cleaning apparatus 18, is, of course, well suited to a coating system which utilizes powder coatings of only two colors. The single filter cleaning apparatus, in the manner previously described, may be quickly reconnected to either of the two filter housings to effect a rapid color changeover between the two colors. However, the illustrated recovery system 12 may also be utilized with powders of more than two colors with no appreciable recovery system downtime. Specifically, with the filter cleaning apparatus connected to one of the two filter housings (i.e., the "active" housing) during recovery system operation, the filter in the "idle" housing may be replaced and the interior of the idle housing cleaned so that a third color of powder may be utilized. Similarly, when the filter cleaning apparatus is reconnected to the previously idle filter housing, the previously active filter housing may be changed out to reclaim a powder of yet another color, and so on.

Moreover, it will be readily appreciated that more than the illustrated two cyclonic filter barrels could be utilized and serviced by the single filter cleaning apparatus. A selected larger number of vertically disposed filter barrels could be grouped about the central vertical axis 60 and operatively associated with the support mechanism 190 which would permit the filter cleaning apparatus 180 to be selectively pivoted about such axis into operative engagement with any selected one of the greater number of filter barrels.

Figure 7A:
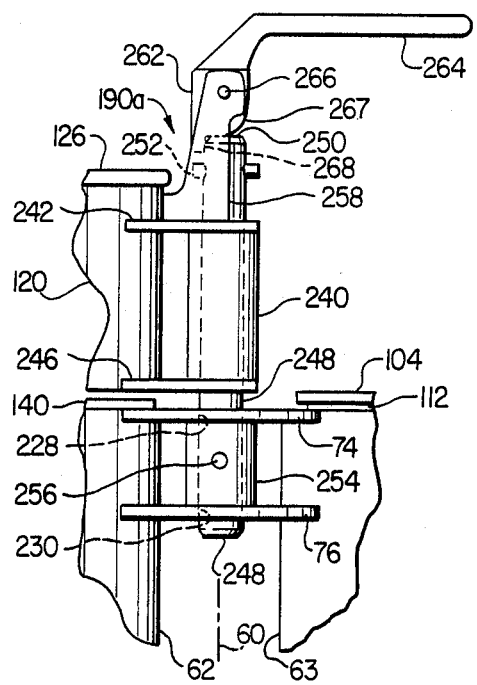
FIG. 7A is a view similar to that to of FIG. 7 but with the alternate support mechanism in its elevated position.
Figure 8:
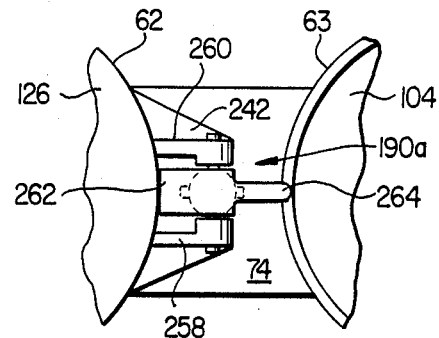
FIG. 8 is a top plan view of the alternate support mechanism depicted in FIG. 7.

Illustrated in FIGS. 7, 7A and 8 is an alternate embodiment $190_a$ of the previously described support mechanism 190. Support mechanism $190_a$ includes a vertically extending hollow cylindrical support sleeve 240 which is secured to the housing 120, in a laterally spaced relationship therewith, by a pair of vertically spaced upper and lower support plates 242, 246 which are welded at their inner ends to circumferential portions of the housing 120, and at their outer ends to the upper and lower ends of the sleeve 240. Sleeve 240 slidably receives a central longitudinal portion of an elongated cylindrical jacking shaft 248 which has an upper end 250 that is somewhat higher than the cover plate 126 of housing 120. A safety stop pin 252 extends transversely through an upper end portion of the shaft 248 and projects outwardly from opposite side surface portions thereof.

A hollow cylindrical guide sleeve member 254 is vertically connected between the support plates 74, 76 and is in registry with the circular openings 228, 230 formed therein. A lower end portion of the jacking shaft 248 extends downwardly through the opening 228, the sleeve 254, and the opening 230, and is fixedly secured to the sleeve 254 by a retaining pin 256 extending transversely through the sleeve 254 and the shaft 248. Welded at their lower ends to the upper support plate 242 and the housing 120 are a pair of spaced apart, vertically extending support arms 258, 260. An inner end portion 262 of a jack handle 264 is positioned between the laterally thickened upper ends of the support arms 258, 260 and is pivotally secured thereto by means of a retaining pin 266.

The housing 120 is depicted in FIG. 7 in its normal operating position in which the housing 120 rests upon and compresses the annular seal element 140 at the upper end of the housing 62. In the event of an explosion within the housing 62 the housing 120 (together with its suspended filter element) is lifted off of the seal 140 to vent the interior of housing 62. This causes the sleeve 240 to slide upwardly along the shaft 248 and a corresponding lifting of the support arms 258, 260 and the jack handle 264. Such pressure-caused lifting of the housing 120 is terminated when the upper end of the sleeve 240 is forced into engagement with the outer ends of stop pin 252. In a manner similar to that described in conjunction with the support mechanism 190, this interengagement between the pin 252 and the sleeve 240 acts as a safety device to prevent the housing 120 from being completely separated from the balance of the recovery system 12.

The underside of the inner end portion 262 of the jack handle 264 is provided with a cammed surface 267 which terminates at its outer end in a flat stop surface 268. With the housing 120 resting upon the seal 140, and the jack handle 264 extending downwardly as depicted in FIG. 7, the cammed surface 267 is spaced slightly upwardly from the upper end 250 of the jacking shaft 248 so that there is no mechanical lifting force exerted by the support mechanism $190_a$ on the housing 120. However, by pivoting the jack handle 264 in a counterclockwise direction from its downwardly extending position illustrated in FIG. 7A, the cammed surface 267 is brought into engagement with the upper end 250 of the jacking shaft 248 to lift the housing 120 (after it has been disconnected from filter 78) upwardly from the housing 62. Stop surface 268 functions to limit the counterclockwise rotation of jack handle 264 when the stop surface engages the jacking shaft 248.

Housing 120 may then be pivoted about the axis 60 (as previously described in conjunction with the support mechanism 190) to a position in which it is disposed directly over the filter housing 63. The jack handle 264 may then be pivoted in a clockwise direction to lower the housing 120 onto the housing 63 for operative connection thereto as previously described. As the jacking handle 264 approaches its downwardly extending position as depicted in FIG. 7, the cammed surface 267 is moved out of engagement with the upper end 250 of shaft 248 to transfer the entire weight of the housing 120 and its internal filter backflushing system 180 from the support mechanism $190_a$ to the housing 63.

It can be seen from the foregoing that the present invention provides a multi-color powder recovery system which, compared to conventional recovery systems, provides substantial reductions in system downtime, labor costs and equipment costs, while at the same time providing for significantly improved and simplified cleaning access to the individual filter barrels.

While the illustrated recovery system has been described in conjunction with the filtration of dry coating powder from air drawn through cyclonic filter barrels, it will be appreciated that various principles of the present invention could also be utilized in a variety of other applications having modified structure and operation. For example, a similar system could be utilized in conjunction with particulate-laden gas flows other than air. Similarly, non-cyclonic filter housings (without filter shrouds) could be used, and the particulate-laden gas stream could be forced through the housings instead of being drawn therethrough. Additionally, as previously mentioned, the recovery system could be provided with more than the representatively illustrated two filter barrels.

The foregoing detailed description is to be clearly understood as being given by way of illustration and example only, the spirit and scope of the present invention being limited solely by the appended claims.

What is claimed is:

1. A filtration system comprising:
   a plurality of separate filter housings each adapted to have a hollow filter mounted therein in a manner such that gas is flowed into a selected one of said separate filter housings, across its filter into the interior thereof, and then outwardly through the selected filter housing to remove particulate matter from the gas while each other filter housing and its associated filter are idle so that they may be cleaned or serviced during gas flow through said selected filter housing;
   filter cleaning means connectable to any selected one of said plurality of separate filter housings and operable to backflush a filter mounted therein, said filter cleaning means including a gas discharge housing having an inlet for receiving filtered gas and an outlet for discharging the received filtered gas, and a filter backflushing system carried within said gas discharge housing for movement therewith; and
   support means for supporting said gas discharge housing in a manner permitting it to be disconnected from one of said plurality of separate filter housings, pivoted about an axis of said support means, and then operatively connected to a selected other one of said plurality of separate filter housings to receive filtered gas discharged therefrom.

2. The filtration system of claim 1 wherein:
   said axis is generally vertical and said plurality of filter housings are laterally spaced about said axis, extend generally parallel thereto, and have vertically aligned upper ends,
   said filter cleaning means are adapted to rest upon any selected one of said upper ends of said plurality of filter housings, and
   said support means are operative to jack said filter cleaning means upwardly from the upper end of a first one of said plurality of filter housings to an elevated position, permit the elevated filter cleaning means to be pivoted about said axis into alignment with the upper end of a selected second one of said plurality of filter housings, and then lower the pivoted filter cleaning means onto the upper end of said selected second one of said filter housings.

3. The filtration system of claim 2 further comprising:
   means for removably suspending a filter element from said filter cleaning means so that the suspended filter element extends downwardly into the filter housing upon which said filter cleaning means rest.

4. The filtration system of claim 1 wherein:
   said plurality of filter housings are vertically disposed cyclonic filter housings having upper ends, and
   said filtration system further comprises means for vertically suspending filter elements within said plurality of filter housings in a manner such that the suspended filter elements are removable through said upper ends, and hollow cylindrical filter shrouds adapted to circumscribe the suspended filter elements, said filter shrouds being suspendable from and upwardly removable through said upper ends of said plurality of filter housings.

5. The filtration system of claim 1 wherein:
said plurality of filter housings have upper end openings formed therein,
said filter cleaning means are adapted to rest upon any selected one of said plurality of filter housings and cover the upper end opening therein, and
said support means are operative to permit said filter cleaning means to be lifted by pressure within the filter housing upon which they rest to thereby vent such filter housing.

6. The filtration system of claim 5 wherein:
said support means further include safety stop means for limiting the upward travel of said filter cleaning means.

7. A filtration system comprising:
a plurality of filter housings each having an upper end with an outlet opening formed therethrough, an inlet opening for receiving a flow of particulate-laden gas, and means for mounting a hollow filter in the housing in a manner such that gas entering the housing inlet opening may be sequentially flowed through the housing, across its filter into the interior thereof, and then outwardly through the housing outlet opening;
filter cleaning means adapted to rest upon any of said upper ends of said plurality of filter housings and operable to backflush a filter mounted in the filter housing disposed beneath said filter cleaning means and to vent such filter housing when lifted therefrom; and
support means for supporting said filter cleaning means for movement along a vertical axis and pivotal motion about said axis to a plurality of rotational positions in which said filter cleaning means are operatively aligned with different ones of said upper ends of said plurality of filter housings, said support means including;
jack means for selectively raising and lowering said filter cleaning means, whereby said filter cleaning means may be raised from operative engagement with one of said upper ends of said plurality of filter housings, pivoted about said axis, and then lowered into engagement with a selected other one of said upper ends of said plurality of filter housings,
vent lift means for permitting said filter cleaning means to be lifted from a filter housing upon which said filter cleaning means rest by a predetermined pressure within such filter housing, and
stop means for limiting the height of pressure-caused lifting of said filter cleaning means from the filter housing upon which said filter cleaning means rest.

8. The filtration system of claim 7 wherein:
said jack means are operative, during lowering of said filter cleaning means onto one of said filter housings, to transfer the entire weight of the filter cleaning means from said support means to such filter housing.

9. The filtration system of claim 7 wherein:
said filter cleaning means include a clean air discharge housing and a filter backflushing system operatively mounted within said clean air discharge housing.

10. A filtration system comprising:
a plurality of filter housings each having an upper end with an outlet opening formed therethrough, an inlet opening for receiving a flow of particulate-laden gas, and means for mounting a hollow filter in the housing in a manner such that gas entering the housing inlet opening is sequentially flowed through the housing, across its filter into the interior thereof, and then outwardly through the housing outlet opening;
filter cleaning means adapted to rest upon any of said upper ends of said plurality of filter housings and operable to backflush a filter mounted in the filter housing disposed beneath said filter cleaning means and to vent such filter housing when lifted therefrom, said filter cleaning means including a clean air discharge housing and a filter backflushing system operatively mounted within said clean air discharge housing; and
support means for supporting said filter cleaning means for movement along a vertical axis and pivotal motion about said axis to a plurality of rotational positions in which said filter cleaning means are operatively aligned with different ones of said upper ends of said plurality of filter housings, said support means including:
jack means for selectively raising and lowering said filter cleaning means, whereby said filter cleaning means may be raised from operative engagement with one of said upper ends of said plurality of filter housings, pivoted about said axis, and then lowered into engagement with a selected other one of said upper ends of said plurality of filter housings,
vent lift means for permitting said filter cleaning means to be lifted from a filter housing upon which said filter cleaning means rest by a predetermined pressure within such filter housing, and
stop means for limiting the height of pressure-caused lifting of said filter cleaning means from the filter housing upon which said filter cleaning means rest, said support means further including:
a support sleeve extending longitudinally along said vertical axis and secured to said clean air discharge housing in a laterally spaced relationship therewith, said support sleeve having an upper end wall positioned higher than said upper ends of said plurality of filter housings,
a vertically extending jacking shaft having an upper end portion coaxially and slidably received within a lower longitudinal portion of said support sleeve,
a cylindrical adjustment member coaxially and slidably received in said support sleeve above said jacking shaft, said adjustment member being threadedly connected to an upper end portion of said jacking shaft and having an upper end portion extending upwardly through said upper end wall of said support sleeve,
a crank handle having an inner end secured to said upper end portion of said adjustment member,
a guide sleeve extending longitudinally along said vertical axis and positioned below said support sleeve, said guide sleeve having a vertically extending slot formed through a sidewall portion thereof, said guide sleeve slidably receiving a lower end portion of said jacking shaft, means for holding said guide sleeve in a fixed position, and a stop pin transversely secured to said lower end portion of said jacking shaft and received in said vertically extending slot in said guide sleeve.

11. The filtration system of claim 10 wherein:

said means for holding said guide sleeve in a fixed position comprise means for securing said guide sleeve to one of said plurality of filter housings.

12. A filtration system comprising:

a plurality of filter housings each having an upper end with an outlet opening formed therethrough, an inlet opening for receiving a flow of particulate-laden gas, and means for mounting a hollow filter in the housing in a manner such that gas entering the housing inlet opening is sequentially flowed through the housing, across its filter into the interior thereof, and then outwardly through the housing outlet opening;

filter cleaning means adapted to rest upon any of said upper ends of said plurality of filter housings and operable to backflush a filter mounted in the filter housing disposed beneath said filter cleaning means and to vent such filter housing when lifted therefrom, said filter cleaning means including a clean air discharge housing and a filter backflushing system operatively mounted within said clean air discharge housing; and support means for supporting said filter cleaning means for movement along a vertical axis and pivotal motion about said axis to a plurality of rotational positions in which said filter cleaning means are operatively aligned with different ones of said upper ends of said plurality of filter housings, said support means including:

jack means for selectively raising and lowering said filter cleaning means, whereby said filter cleaning means may be raised from operative engagement with one of said upper ends of said plurality of filter housings, pivoted about said axis, and then lowered into engagement with a selected other one of said upper ends of said plurality of filter housings, vent lift means for permitting said filter cleaning means to be lifted from a filter housing upon which said filter cleaning means rest by a predetermined pressure within such filter housing, and stop means for limiting the height of pressure-caused lifting of said filter cleaning means from the filter housing upon which said filter cleaning means rest, said support means further including:

a support sleeve extending longitudinally along said vertical axis and secured to said clean air discharge housing in a laterally spaced relationship therewith, a vertically extending jacking shaft having a central longitudinal portion slidably received in said support sleeve, and an upper end portion disposed above said support sleeve, said upper end portion having an upper end surface positioned higher than said upper ends of said filter housings, means for anchoring said jacking shaft against appreciable vertical movement, a safety stop pin secured to and projecting radially outwardly from said upper end portion of said jacking shaft and adapted to limit upward travel of said support sleeve along said jacking shaft, a pair of spaced apart, vertically extending support arms secured to said support sleeve for vertical movement therewith and having upper end portions positioned above said upper end surface of jacking shaft, and a jack handle having an inner end portion positioned between and pivotally connected to said upper end portions of said support arms, said inner end portion having a downwardly facing, cammed surface adapted to engage said upper end surface of said jacking shaft and cause a lifting of said support sleeve in response to pivotal motion of said jack handle in one direction, and to cause a lowering of said support sleeve, and disengagement between said cammed surface and said upper end surface in response to pivotal motion of said jack handle in the opposite direction.

13. The filtration system of claim 12 wherein:

said means for anchoring said jacking shaft include a guide sleeve receiving a lower end portion of said jacking shaft, a pin member extending through said guide sleeve into said lower end portion of said jacking shaft, and means for securing said guide sleeve to one of said plurality of filter housings.

14. A filtration system comprising:

a plurality of filter housings each having an upper end with an outlet opening formed therethrough, an inlet opening for receiving a flow of particulate-laden gas, and means for mounting a hollow filter in the housing in a manner such that gas entering the housing inlet opening is sequentially flowed through the housing, across its filter into the interior thereof, and then outwardly through the housing outlet opening;

filter cleaning means adapted to rest upon any of said upper ends of said plurality of filter housings and operable to backflush a filter mounted in the filter housing disposed beneath said filter cleaning means and to vent such filter housing when lifted therefrom; and support means for supporting said filter cleaning means for movement along a vertical axis and pivotal motion about said axis to a plurality of rotational positions in which said filter cleaning means are operatively aligned with different ones of said upper ends of said plurality of filter housings, said support means including:

jack means for selectively raising and lowering said filter cleaning means, whereby said filter cleaning means may be raised from operative engagement with one of said upper ends of said plurality of filter housings, pivoted about said axis, and then lowered into engagement with a selected other one of said upper ends of said plurality of filter housings, vent lift means for permitting said filter cleaning means to be lifted from a filter housing upon which said filter cleaning means rest by a predetermined pressure within such filter housing, and stop means for limiting the height of pressure-caused lifting of said filter cleaning means from the filter housing upon which said filter cleaning means rest, said filtration system further comprising individual cover plates adapted to rest upon and cover the upper ends of the filter housings to which said filter cleaning means are not connected, and said filter mounting means including means for suspending a filter element from each of said cover plates so that the suspended filter is operatively mounted in the filter housing beneath the cover plate and is withdrawable through the outlet opening of such filter housing, and means for suspending a filter element from said filter cleaning means so that it is operatively disposed within the filter housing upon which said filter cleaning means rest.

15. The filtration system of claim 14 wherein:
said means for suspending a filter element include draw bolt and draw bar assemblies operatively connectable to said filter cleaning means and to said cover plates.

16. The filtration system of claim 15 wherein:
said means for suspending a filter element further include seal means cooperable with said draw bolt and draw bar assemblies to seal opposite upper and lower ends of the suspended filter elements.

17. The filtration system of claim 14 wherein:

said filter housings are cyclonic filter housings having hollow cylindrical filter shrouds adapted to outwardly circumscribe upper longitudinal portions of the suspended filter elements, and said filtration system further comprises means for removably suspending said filter shrouds from said upper ends of said filter housings so that the suspended filter shrouds can be lifted outwardly through said outlet openings in said upper ends of said filter housings.

18. The filtration of claim 17 wherein:
said means for removably suspending said filter shrouds include upwardly facing annular ledges formed in said upper ends of said filter housings around said outlet openings therein, and upper end flanges formed on said filter shrouds and adapted to rest upon said annular ledges.

19. A filtration system comprising:
a plurality of filter housings each having an upper end with an outlet opening formed therethrough, an inlet opening for receiving a flow of particulate-laden gas, and means for mounting a hollow filter in the housing in a manner such that gas entering the housing inlet opening is sequentially flowed through the housing, across its filter into the interior thereof, and then outwardly through the housing outlet opening;

filter cleaning means adapted to rest upon any of said upper ends of said plurality of filter housings and operable to backflush a filter mounted in the filter housing disposed beneath said filter cleaning means and to vent such filter housing when lifted therefrom, and support means for supporting said filter cleaning means for movement along a vertical axis and pivotal motion about said axis to a plurality of rotational positions in which said filter cleaning means are operatively aligned with different ones of said upper ends of said plurality of filter housings, said support means including:

jack means for selectively raising and lowering said filter cleaning means, whereby said filter cleaning means may be raised from operative engagement with one of said upper ends of said plurality of filter housings, pivoted about said axis, and then lowered into engagement with a selected other one of said upper ends of said plurality of filter housings, vent lift means for permitting said filter cleaning means to be lifted from a filter housing upon which said filter cleaning means rest by a predetermined pressure within such filter housing, and stop means for limiting the height of pressure-caused lifting of said filter cleaning means from the filter housing upon which said filter cleaning means rest; and cooperating interengageable means on said plurality of filter housings and said filter cleaning means for aligning said filter cleaning means and the filter housing upon which they rest.

20. The filtration system of claim 19 wherein:
said cooperating interengageable means include an alignment pin secured to said filter cleaning means, and alignment tab members secured to said filter housings and having openings formed therein to receive said alignment pin.

21. A dry powder coating spraying system comprising:
means for selectively spraying a dry powder onto an object to be powder coated;

means for collecting sprayed dry powder not adhering to the object; and means for recovering the collected dry powder, including:

a plurality of separate filter housings grouped about an axis;

means for operatively mounting a filter element in each of said plurality of separate filter housings, means for flowing a gas stream, with collected dry powder entrained therein, through a selected one of said plurality of separate filter housings to capture entrained dry powder therein while each other filter housing and its associated filter are idle and may be cleaned or serviced during gas flow through said selected filter housing, filter cleaning means for backflushing a selected one of the filter elements, said filter cleaning means including a gas discharge housing connectable to any selected one of said plurality of separate filter housings and having an inlet for receiving filtered gas and an outlet for discharging the received filtered gas, and a filter backflushing system carried within said gas discharge housing for movement therewith, and support means for carrying said gas discharge housing, said support means being operable to sequentially move said gas discharge housing in a first direction along said axis out of operative engagement with a first one of said plurality of separate filter housings, permit the disengaged gas discharge housing to be pivoted about said axis into alignment with a selected second one of said plurality of separate filter housings, and then move said gas discharge housing in the opposite direction along said axis into operative engagement with said selected second one of said plurality of separate filter housings.

22. The spraying system of claim 21 wherein:

said plurality of separate filter housings are vertically disposed, grouped about a central vertical axis, and have vertically aligned upper ends adapted to support said gas discharge housing, and said support means are operative to sequentially lift said gas discharge housing upwardly from one of said upper ends, permit the lifted gas discharge housing to be pivoted relative to a portion of said support means about said central vertical axis, and then lower the pivoted gas discharge housing onto another of said upper ends.

23. The spraying system of claim 21 wherein:

said means for selectively spraying comprise a spray booth adapted to receive the object, a powder spray gun, a powder and gun control cabinet, conduit means interconnected between said spray gun and said control cabinet, a powder supply cannister, and conduit means interconnected between said control cabinet and said powder supply cannister, said means for collecting sprayed dry powder include a hopper operatively connected to said spray booth, and said means for flowing a gas stream include conduit means connected at one end to said hopper and removably connectable at an opposite end to a selected one of said filter housings, a scavenge pump, and conduit means interconnected between said filter cleaning apparatus and the inlet of said scavenge pump.

24. The spraying system of claim 23 wherein: said filter housings are cyclonic filter housings which extend vertically and have hollow cylindrical filter shrouds operatively disposed therein.

25. The spraying system of claim 24 wherein: said filter housings have upper ends and said filter shrouds are removably suspended from said upper ends.

26. The spraying system of claim 25 wherein: said filter cleaning apparatus has a vertically disposed filter element suspended therefrom and extending downwardly into one of said filter housings, each other filter housing having a cover plate resting upon the upper end thereof and having a vertically disposed filter element suspended therefrom and extending downwardly into the filter housing, said filter elements being removable through said upper ends of said filter housings.

* * * * *